United States Patent
Rossin

Patent Number: 5,794,004
Date of Patent: Aug. 11, 1998

[54] CLIPPER ASSISTED DECOMPOSITION OF BOW-TIE QUADRILATERALS

[75] Inventor: Theodore G. Rossin, Ft. Collins, Colo.

[73] Assignee: Hewlett-Packard Company, Palo Alto, Calif.

[21] Appl. No.: 574,532

[22] Filed: Dec. 19, 1995

[51] Int. Cl.$^6$ ............................................. G06F 15/00
[52] U.S. Cl. ............................................. 345/434
[58] Field of Search ........................ 395/141, 143, 395/134; 345/441, 443, 433, 434

[56] References Cited

U.S. PATENT DOCUMENTS 5,335,319  8/1994  Obata ........................... 395/141

Primary Examiner—Phu K. Nguyen
Attorney, Agent, or Firm—Edward L. Miller

[57] ABSTRACT

Extra hardware to compute the fifth vertex of a bow-tie quadrilateral is avoided by using the clipping system to do the calculations. This is accomplished by inspecting quadrilaterals (as they are projected onto the viewing plane) to see if they contain pairs of self-intersecting sides. Those that do are further classified as to type and subtype, depending respectively upon how the vertex numbering scheme identifies the intersecting non-adjacent sides and upon which of X and Y is the major axis. The hardware normally associated with a clipper can be "borrowed" and used in a non-clipping fashion to find the X coordinate for a YZ work plane (or the Y coordinate for an XZ work plane) that is associated with the fifth vertex ($V_4$) created by the self-intersection. Once this is done the hardware of the clipper can be further borrowed to actually intersect (i.e., clip) one of the self-intersecting sides with that work plane, which produces a complete description of all the pixel coordinates for $V_4$. Once $V_4$ is known the bow-tie is divided into two triangles, each containing two adjacent vertices not found in the other triangle and each also containing V4 as a common vertex.

2 Claims, 8 Drawing Sheets

TYPE Ay

TYPE By

CLIPPER ASSISTED DECOMPOSITION OF BOW-TIE QUADRILATERALS

BACKGROUND OF THE INVENTION

A modern graphics system represents the surface of an object as a collection of polygons; in turn, each polygon is described by a list of vertices. In some systems the surface of interest is represented principally by polygons that are quadrilaterals. In such systems it is quite common that the vertices of any given quadrilateral do not all lie in the same plane. The "real" shape of such a non-planar quadrilateral is generally not a live issue; even assuming that the vertices are connected by straight lines, there are an infinite number of different shapes for the enclosed interior surface that are consistent with the given vertices. When actually drawing a non-planar quadrilateral on an output device, interpolation techniques are used to select pixel locations that approximate a minimally curved surface for the enclosed interior of each quadrilateral. The reason that the "real" shape of the quadrilateral can be ignored in favor of the interpolated approximation is that the larger features of the object's shape are represented by progressive differences between the various collections of vertices for a large number of quadrilaterals (i.e., the quadrilaterals themselves are small compared to the size of those features).

Nevertheless, it sometimes happens in a graphics system incorporating non-planar quadrilaterals that a particular quadrilateral has, when projected onto, say, the XY plane of an output device (e.g., the screen of a CRT) five vertices instead of four. The extra vertex arises because of a twist in the quadrilateral, giving it a "bow-tie" shape. The fifth vertex is the apparent intersection of two of the sides (that are separated by an intervening side) as seen after the projection. And, if pressed on the matter, we would even agree that it is possible that a quadrilateral itself could actually be a bow-tie without any need of a projection to make it so. That is, the quadrilateral as given has two nonadjacent sides that intersect each other at some fifth vertex.

Clipping is an operation where a portion of an object is removed because that portion extends beyond a boundary. For example, a solid object may extend beyond a plane. In such a case the various quadrilaterals that describe the object need to be altered to remove vertices that lie beyond the clip boundary. This produces arbitrary polygons with new vertices; i.e., those vertices that are at the intersection of an edge with the clip boundary. For example, the clip boundary may be the surfaces of a "viewing volume" within which the object is located. The viewing volume could be a truncated pyramid, or something more rectangular, or even cubical. As the object is scaled in size or reoriented within the viewing volume, differing portions of the object may intersect with the clip boundaries. Any modern graphics system worthy of the name includes a clipping system.

In some systems the quadrilaterals are decomposed into constituent triangles prior to certain rendering operations, such as the selection by a graphics accelerator of pixel values (location, colors, depth, etc.) for pixels on or interior to the quadrilaterals. Such decomposition is desirable, since dedicated hardware to clip and render triangles is simpler than that needed for quadrilaterals, and it runs faster, too. Non-bow-tie quadrilaterals are relatively easy to decompose into triangles; it is generally sufficient to select two non-adjacent vertices and then associate with each the vertices on either side thereof. But in the case of a bow-tie quadrilateral the fifth vertex is common to each triangle, with a certain adjacent two of the original vertices defining the balance of one triangle, and the other two original vertices defining the other. Thus, decomposing a bow-tie quadrilateral involves (1) detecting the existence of the fifth vertex (determining "bow-tie-ness"), and (2), determining the coordinates of the fifth vertex. However, quadrilaterals, whether bow-tie or not, are specified by merely their (four) corner vertices. Discovering that a fifth vertex exists is one thing; once its existence is known, finding all its coordinates can represent a significant computational task. It would be desirable if the finding of the various coordinates for a fifth vertex of a bow-tie quadrilateral could be performed with hardware whose presence is already required for other purposes, anyway.

In the disclosure that follows references will be made to various graphics techniques that are part and parcel of the prior art and with which it is legitimately expected that those skilled in the art will be familiar. Nevertheless, as a convenience to those who have a life other than the study of graphics systems, we recommend that the non-specialist have access to an introductory text, such as Fundamental of Interactive Computer Graphics, by James D. Foley and Andres Van Dam, published in 1982 (and revised in 1984) by Addison-Wesley, ISBN 0-201-14468-9. We shall occasionally explicitly defer to Foley and Van Dam for explanations of certain common techniques with which some aspect of the invention cooperates. While this does not constitute a genuine incorporation by reference, neither is it defect in the disclosure, since the knowledge being relied upon appears in a very popular undergraduate text book almost fifteen years old.

SUMMARY OF THE INVENTION

A solution to the problem of avoiding extra hardware to compute the fifth vertex of a bow-tie quadrilateral is to fool the clipping system and let it do the calculations. Actually, it is more that otherwise idle clipping hardware is put to use in place of yet other dedicated hardware. This is accomplished by inspecting quadrilaterals (as they are projected onto the viewing plane) to see if they contain pairs of self-intersecting sides. Those that do are classified as "evil bow-tie quads". These then are further classified as to type and subtype, depending respectively upon how the vertex numbering scheme identifies the intersecting non-adjacent sides and upon which of X and Y is the major axis. The hardware normally associated with a clipper can be "borrowed" and put to work evaluating some new (i.e., non-clipper type) relationships that find the X coordinate for a YZ work plane (or the Y coordinate for an XZ work plane) that is associated with the fifth vertex ($V_4$) created by the self-intersection. Once this is done the clipper mechanism can be further borrowed to actually intersect one of the self-intersecting sides with that work plane (which is a class of task that clippers know how to do), which produces a complete description of all the pixel coordinates for $V_4$. Once $V_4$ is known, the evilness of the bow-tie quad can be exorcised by simply dividing it into two triangles, each containing two adjacent vertices not found in the other triangle and each also containing V4 as a common vertex.

3

Figure 4:
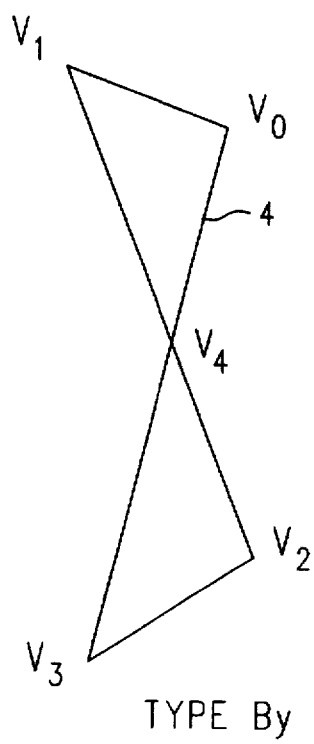
Figure 5:
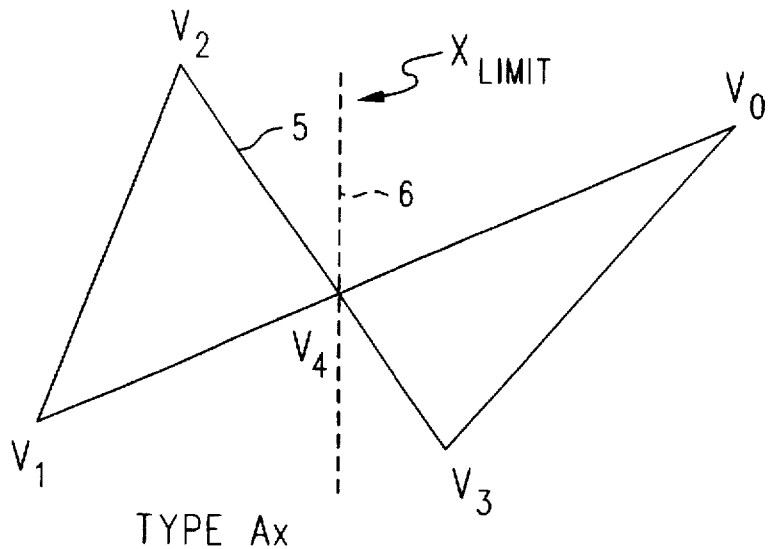
Figure 6:
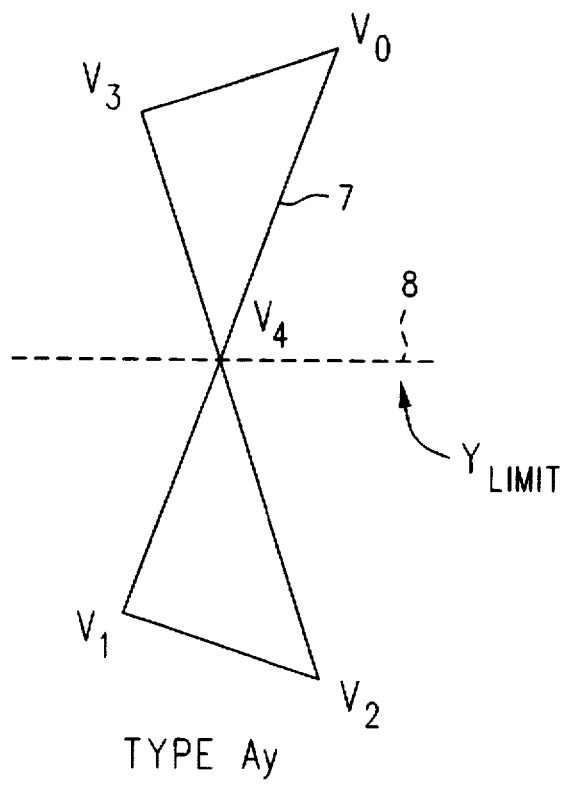
Figure 7:
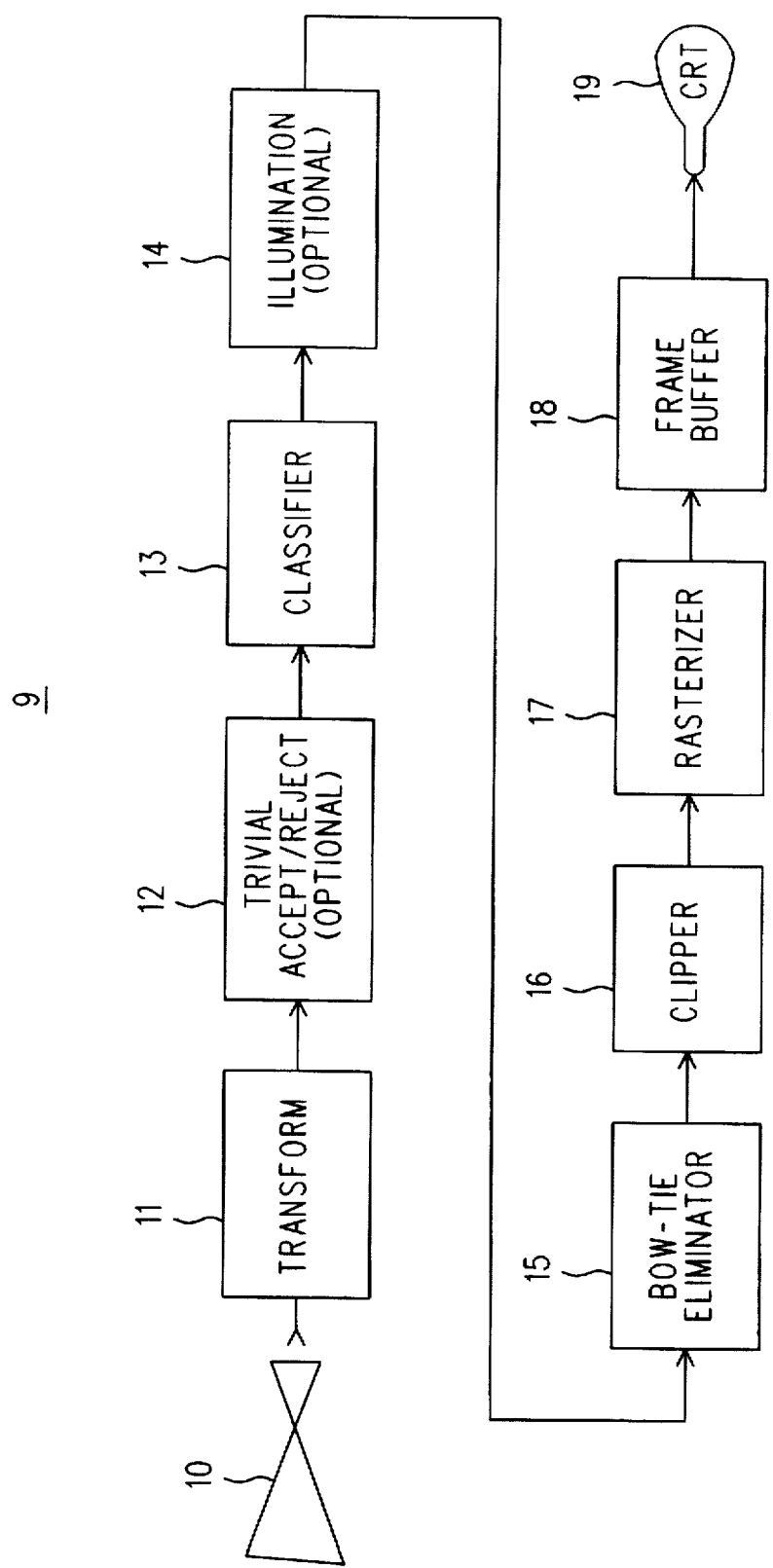
Figure 8:
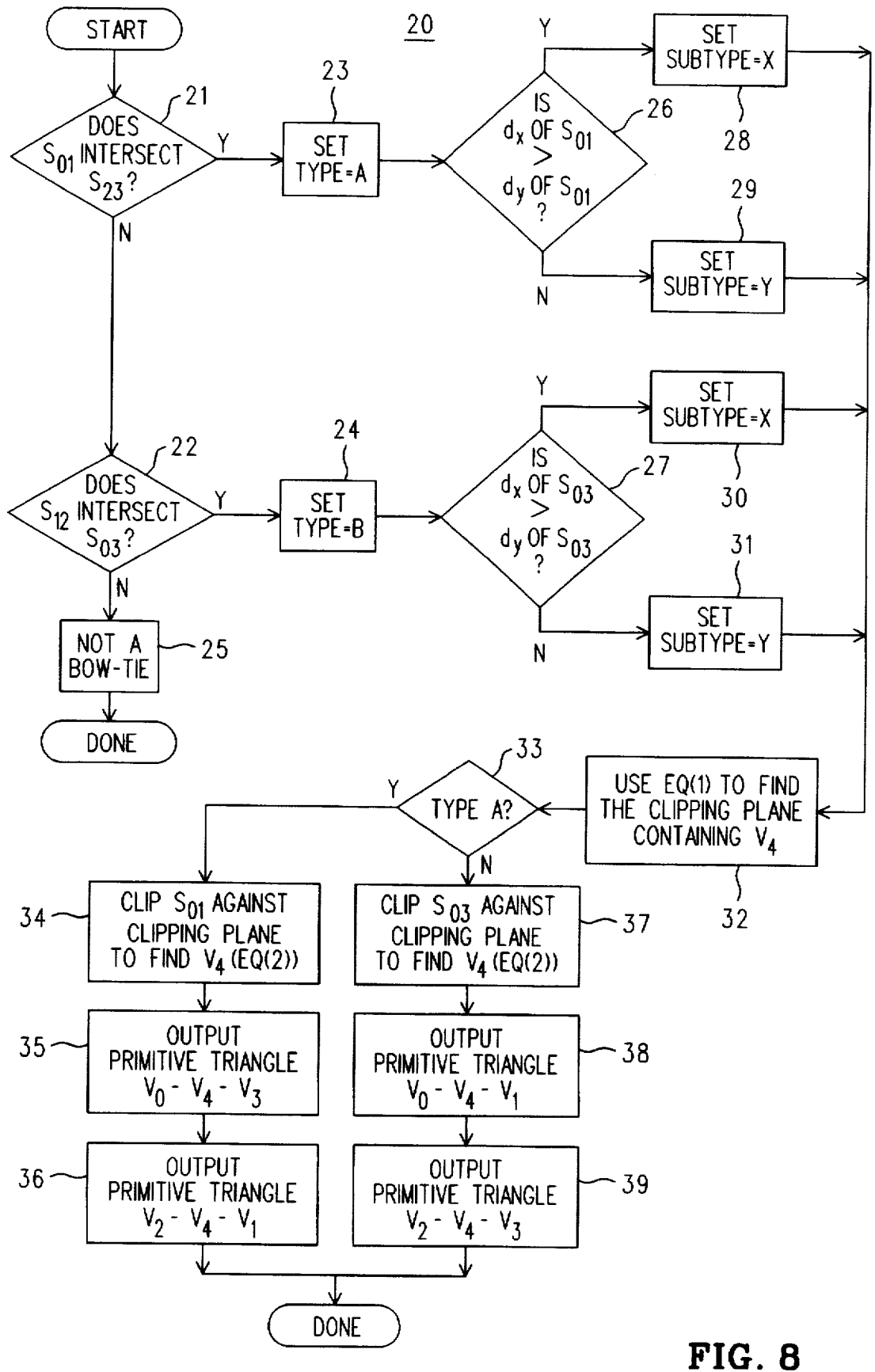
Figure 9:
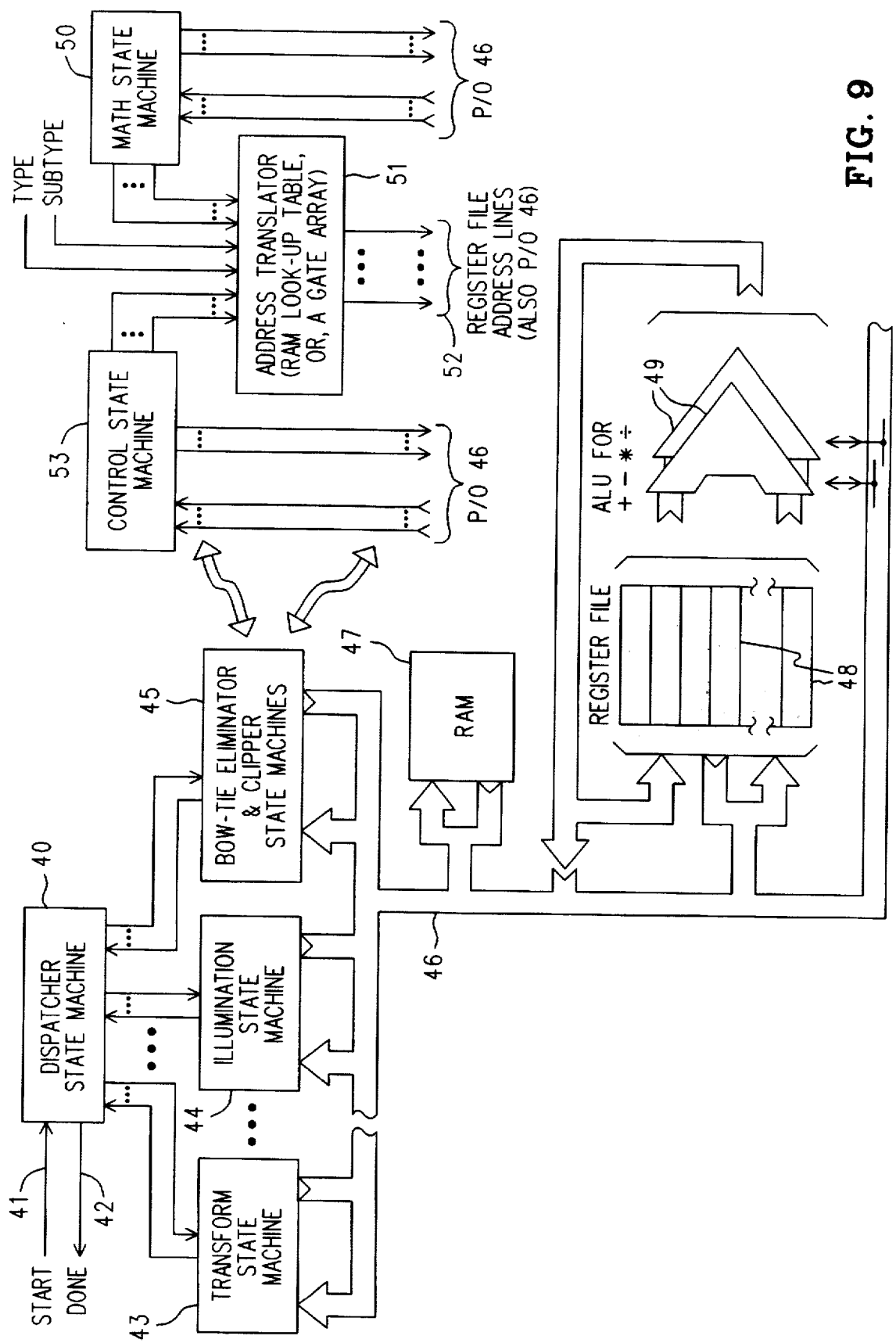
Figure 10:
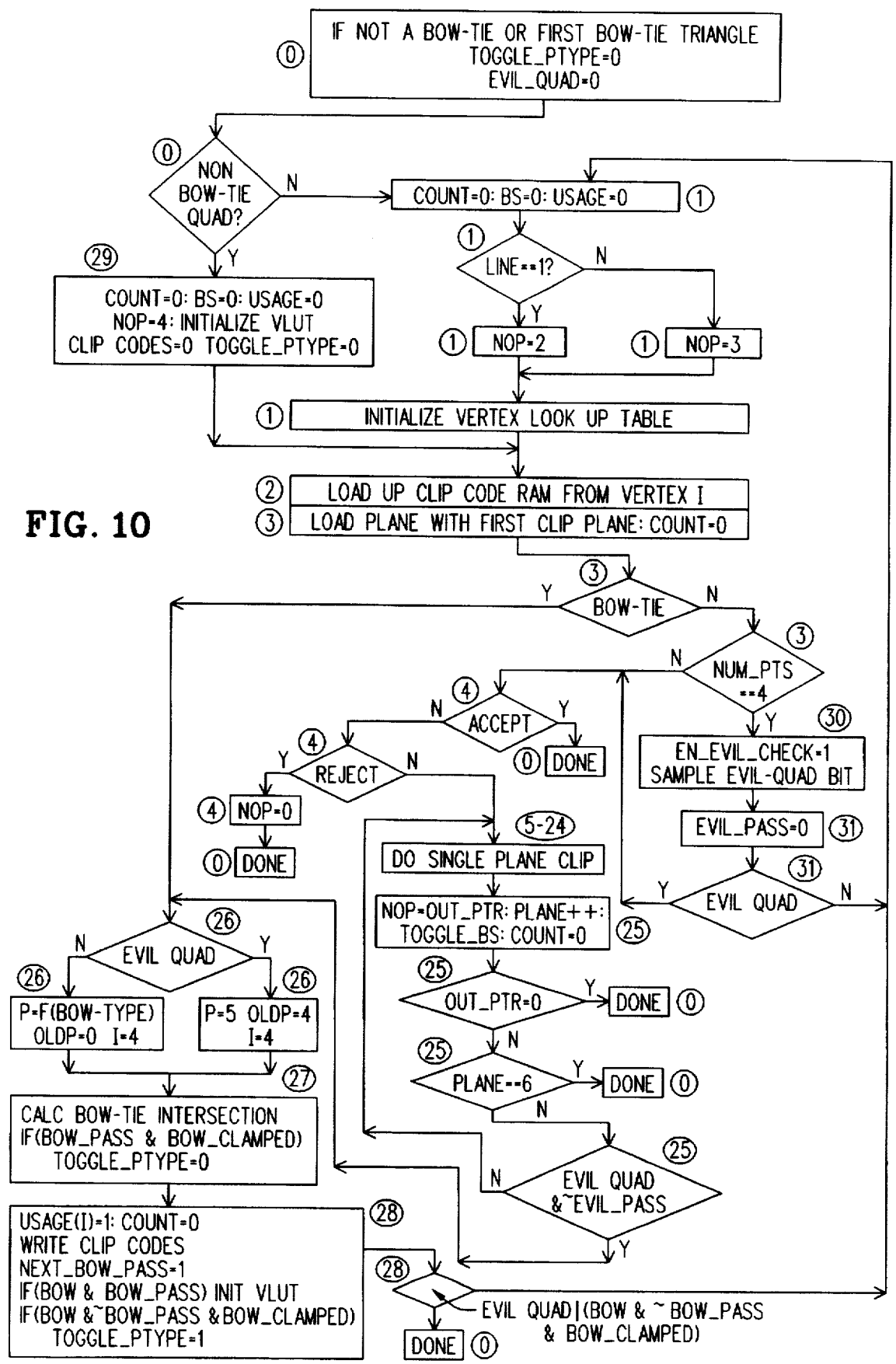
Figure 11:
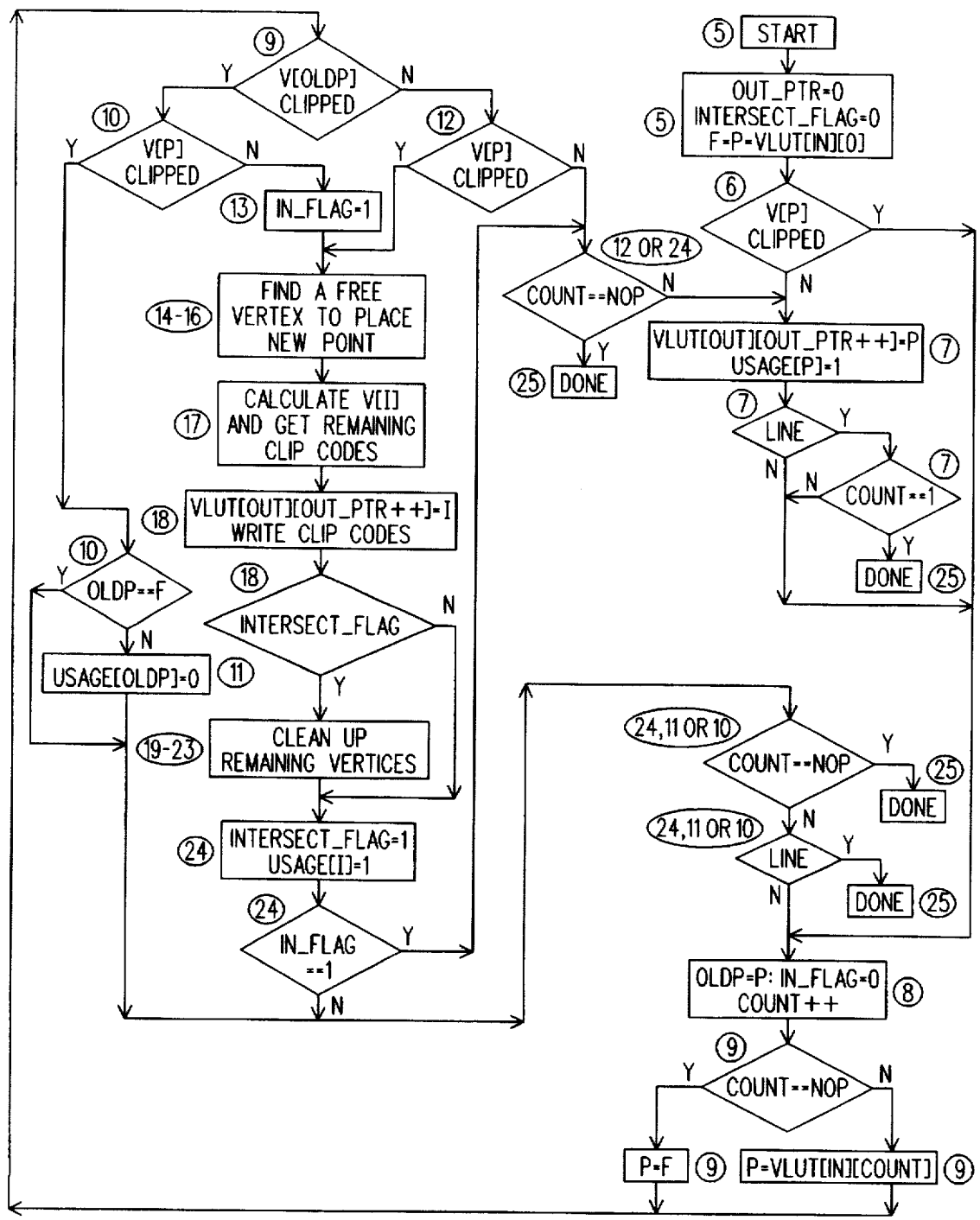

FIG. 4 is an illustration of a bow-tie quadrilateral of type By;

FIG. 5 illustrates the use of a YZ clipping plane located at $X_{LIMIT}$ to find the coordinates of V4 for a bow-tie quadrilateral of type Ax;

FIG. 6 is illustrates the use of an XZ clipping plane located at $Y_{LIMIT}$ to find the coordinates of V4 for a bow-tie quadrilateral of type Ay;

FIG. 7 is a simplified hardware block diagram of a portion of an integrated circuit including a bow-tie eliminator circuit incorporating the principles of FIGS. 1–6;

FIG. 8 is a simplified flow diagram of processes occurring within the hardware depicted in FIG. 7;

FIG. 9 is a more detailed yet still simplified block diagram of both FIG. 7 and of the bow-tie eliminator and clipper portions therein;

FIG. 10 is a detailed flow chart depicting the behavior a state machine 53 of FIG. 9 wherein the operations of controlling clipping and controlling bow-tie elimination have been merged into a combined mechanism; and FIG. 11 is a detailed flow chart depicting an expansion of a portion of the flow chart of FIG. 10.

DESCRIPTION OF A PREFERRED EMBODIMENT

Figure 1:
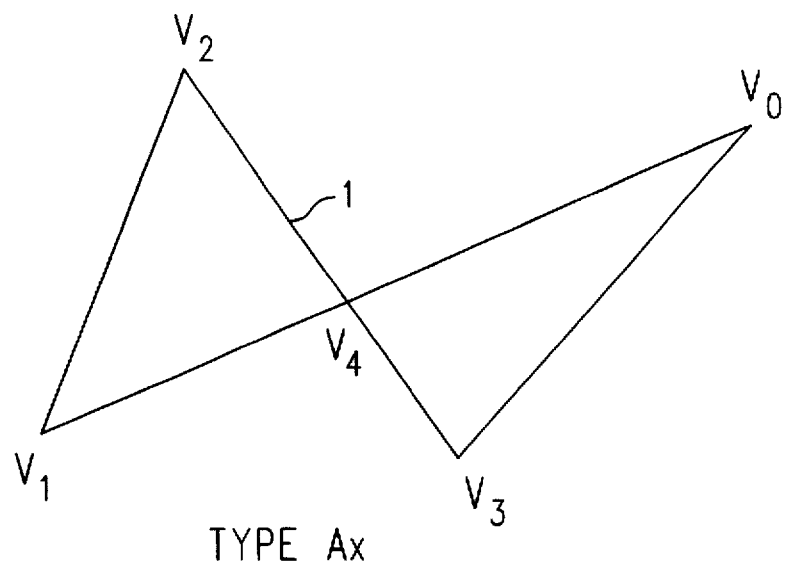
FIG. 1 is an illustration of a bow-tie quadrilateral of type Ax.
Figure 2:
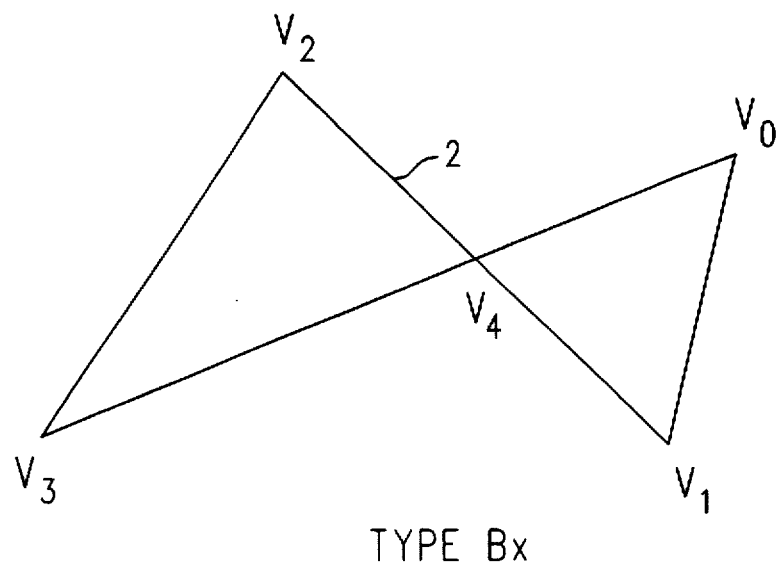
FIG. 2 is an illustration of a bow-tie quadrilateral of type Bx.
Figure 3:
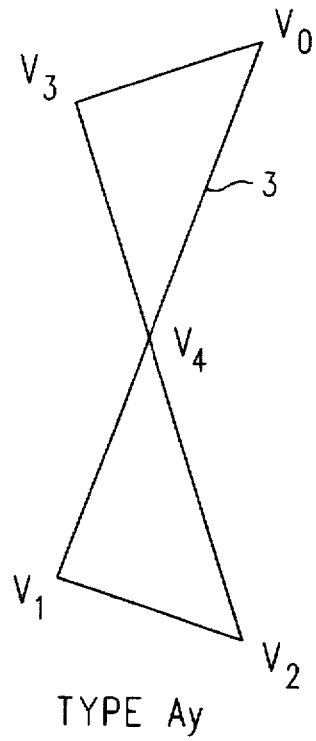
FIG. 3 is an illustration of a bow-tie quadrilateral of type Ay.

Our discussion begins with FIG. 1, wherein is shown a view of a non-planar bow-tie quadrilateral 1. In all of the figures that follow the x axis is horizontal, the y axis is vertical, and the z axis is normal to the plane of the paper. Bow-tie quadrilaterals can be classified into four types. Each of FIGS. 1–4 illustrates one of the four types, according to which edges intersect and their slope. Bow-tie quadrilateral 1 of FIG. 1 is termed a type Ax bow-tie. Bow-ties of type A have intersections between edges $V_0$–$V_1$ and $V_2$–$V_3$ (as in FIGS. 1 and 3), while type B bow-ties have intersections between edges $V_0$–$V_3$ and $V_1$–$V_2$ (as in FIGS. 2 and 4). Bow-ties are further classified as subtype x or y according to which of those two axes is selected to be the location of a clipping plane in the remaining axes. The selection is made to enhance numerical precision during computation, and is based on the axis in which the quadrilateral has the greatest extent. Thus, the bow-tie quadrilateral 1 of FIG. 1 is of type Ax, bow-tie quadrilateral 2 of FIG. 2 is of type Bx, bow-tie quadrilateral 3 of FIG. 3 is of type Ay, and bow-tie quadrilateral 4 of FIG. 4 is of type By.

The four bow-tie quadrilaterals 1–4 of FIGS. 1–4 may be considered to actually be self-intersecting in three dimensional xyz space (possible, but probably unlikely), or (which is more likely), as twisted but non-intersecting quadrilaterals in xyz space whose projections onto the two dimensional viewing plane become self-intersecting as a result of the projection. Either way, the problem is to determine $V_4$ after the projection.

Determining that a quadrilateral is a bow-tie, and further classifying it according to the types described is not particularly difficult, and may be accomplished in a known manner. For example, (and assuming that consecutive adjacent sides are respectively called $S_{01}$, $S_{12}$, $S_{23}$ and $S_{30}$) existence of the bow-tie property may be determined by using line intersection routines/mechanisms to learn if there exists either of an intersection between sides $S_{01}$ and $S_{23}$ and between $S_{12}$ and $S_{30}$.

Once it is known that a quadrilateral is a bow-tie, type A or B is easily assigned by noting which sides do the intersecting: an intersection between $S_{01}$ and $S_{23}$ is of type

4

A and an intersection between $S_{12}$ and $S_{30}$ is of type B. The type information essentially stores for later use the knowledge of which side to supply as an input to the clipper. This is needed because the relationship between the shape of the quadrilateral and how the vertices are named is arbitrary. The determination of subtype X or Y is performed (say, for type A) simply by evaluating the slope of $S_{01}$. If the slope is less than or equal to one then the subtype is X ($|x_1-x_0| \leq |y_1-y_0| \rightarrow$ subtype X). If the slope is greater than one then the subtype is Y. For type B the inquiry is similar, except that it is for the slope of $S_{03}$: ($|x_3-X_0| \leq |y_3-y_0| \rightarrow$ subtype X).

As shown in FIG. 5, the bow-tie quadrilateral therein 5 of subtype x has associated therewith a parameter $X_{LIMIT}$ 6. In a similar fashion the bow-tie quadrilateral 7 of FIG. 6 has associated therewith a parameter $Y_{LIMIT}$ 8. The parameter $X_{LIMIT}$ 6 identifies the location of a YZ clipping plane against which the vector $S_0$ (side of quadrilateral 5) can be clipped to obtain a complete description of $V_4$. The assumption is made that there is no significant difference between finding $V_4$ by intersecting $S_{01}$ against $X_{LIMIT}$ and finding V4 by intersecting $S_{23}$ against $X_{LIMIT}$. Once $V_4$ is found it is then used to render both of the triangles $T_{034}$ and $T_{124}$. To do this we must first find $X_{LIMIT}$. That is done by evaluating the following relationships:

$$X_{LIMIT} = \frac{W_0 \Delta X_0 (\Delta X_2 Y_2 - \Delta Y_2 X_2) + W_2 \Delta X_2 (\Delta Y_0 X_0 - \Delta X_0 Y_0)}{W_0 W_2 (\Delta Y_0 \Delta X_2 - \Delta Y_2 \Delta X_0)} \quad \text{Eq. (1)}$$

Where:

$\Delta X_0 = X_1 W_0 - X_0 W_1$ $\Delta Y_0 = Y_1 W_0 - Y_0 W_1$ $\Delta X_2 = X_3 W_2 - X_2 W_3$ $\Delta Y_2 = Y_3 W_2 - Y_2 W_3$ The W terms in the above equations are present because the coordinates are homogenous coordinates. Those who are unfamiliar with homogeneous coordinates may find an introduction thereto in §7.2 of Foley and Van Dam. The use of homogeneous equations is not, in principle, necessary to the finding of $V_4$ with a clipper after finding either $X_{LIMIT}$ or $Y_{LIMIT}$. It is more that modern high-end graphic systems use homogeneous coordinates for other reasons, anyway, so it is in that setting that the finding of $X_{LIMIT}$ or $Y_{LIMIT}$ and of $V_4$ with a clipper is disclosed. It will be understood that in a system that did not use homogeneous coordinates there are analogous (and simpler) equations that correspond to the ones given above. These are found by letting all W's equal one. For example, Eq. (1) would become:

$$X_{LIMIT} = \frac{\Delta X_0 (\Delta X_2 Y_2 - \Delta Y_2 X_2) + \Delta X_2 (\Delta Y_0 X_0 - \Delta X_0 Y_0)}{(\Delta Y_0 \Delta X_2 - \Delta Y_2 \Delta X_0)} \quad \text{Eq. (1a)}$$

Where:

$\Delta X_0 = X_1 - X_0$ $\Delta Y_0 = Y_1 - Y_0$ $\Delta X_2 = X_3 - X_2$ $\Delta Y_2 = Y_3 - Y_2$ Eq. (1) finds the value of $X_{LIMIT}$ for Type Ax bow-tie quadrilaterals. The same basic equation can be used to find $Y_{LIMIT}$ for Type Ay if certain interchanging is performed on the variables: all the X's are changed to Y's and all the Y's are changed to X's. By performing the interchange (or not, as appropriate) prior to calculating $X_{LIMIT}$ it possible to use the same computational hardware for each of subtypes x and y. It is also possible to perform an interchange that allows whatever mechanism that works for Type A to also perform correctly for Type B. In this case all subscripts of W, X, Y, $\Delta X$, and $\Delta Y$ that are 2's become 1's. All subscripts of $\Delta X$ and $\Delta Y$ that are 0's become 3's. All other subscripts are left alone.

The goal is to have one computational mechanism in hardware that takes care of all four cases. This is accomplished by programming an operational sequence for an appropriate collection of arithmetic resources that includes addressable registers, adders, complimenters, and multipliers, all suitably interconnected by various busses. This goal is reached by including in the computational mechanism an address translation table whose inputs are the quadrilateral type, subtype, and programmatic register identifiers (as would be used if there were but one case, instead of four). The outputs are the actual hardware names (addresses) of the appropriate registers for the actual case at hand. Thus, the computational mechanism always runs the same algorithmic process each time on input data presented in a constant format, but the address translation table arranges that different registers automatically interchange their roles in that algorithm, according to the type and subtype. Another way to describe this is that the address translation table re-maps the register addresses according to the type and subtype, while the programmatically controlled computational mechanism continues as before, as if there were only one combination of type and subtype.

Having found either an $X_{LIMIT}$ or a $Y_{LIMIT}$ clipping plane, the next goal is to turn a clipper loose with one of the edges ($S_{01}$ for Type A or $S_{03}$ for Type B), with the expectation that the clipper will report the intersection of that edge with the given clipping plane. The action of the clipper may be partitioned into two phases. The first phase is the finding of a parameter t by the evaluation of an equation that is, or corresponds to, Eq. (2) below. The parameter t is the ratio of that part of the edge (either $S_{01}$ or $S_{03}$) that is on one side of the clip plane to that part that is on the other, taken so that $0 \leq t \leq 1$ (as opposed to $1 \leq t \leq \infty$). The second phase is the evaluation of a family of equations Eq's (3a-3p) involving the parameter t, which produces the actual coordinates of $V_4$. We show below the form of Eq. (2) that pertains to Type Ax:

$$t = \frac{W_0 X_{LIMIT} - X_0}{X_{LIMIT}(W_0 - W_1) - X_0 + X_1} \quad \text{Eq. (2)}$$

As before, we are interested in a single computational mechanism for finding t and that will handle all the various four cases. This can be done by equipping that computational mechanism with an address translator, similar in nature to what was described for the mechanism that evaluates Eq. (1). The specific interchange relationships needed for Eq. (2) are these: For Type B all subscripts that are 1's become 3's. For subtype y all x's become y's. And, in the event that the graphics system is not using homogeneous coordinates, an analogous equation Eq. (2a) can be found simply by letting all the W's equal one.

Once t is found Eq's (3a-p) can be used to find the actual coordinate values for $V_4$. The particular equations shown are for the case when the Type and subtype combine to be Ax. Analogous equations exist for the other three cases.

$$X_4 = (X_0 - tX_0) + tX_1 \quad (3a)$$

$$Y_4 = (Y_0 - tY_0) + tY_1 \quad (3b)$$

$$Z_4 = (Z_0 - tZ_0) + tZ_1 \quad (3c)$$

$$W_4 = (W_0 - tW_0) + tW_1 \quad (3d)$$

$$\alpha_4 = (\alpha_0 - t\alpha_0) + t\alpha_1 \quad (3e)$$

$$R_4 = (R_0 - tR_0) + tR_1 \quad (3f)$$

$$G_4 = (G_0 - tG_0) + tG_1 \quad (3g)$$

$$B_4 = (B_0 - tB_0) + tB_1 \quad (3h)$$

$$SR_4 = (SR_0 - tSR_0) + tSR_1 \quad (3i)$$

$$SG_4 = (SG_0 - tSG_0) + tSG_1 \quad (3j)$$

$$SB_4 = (SB_0 - tSB_0) + tSB_1 \quad (3k)$$

$$TS_4 = (TS_0 - tTS_0) + tTS_1 \quad (3l)$$

$$TT_4 = (TT_0 - tTT_0) + tTT_1 \quad (3m)$$

$$TR_4 = (TR_0 - tTR_0) + tTR_1 \quad (3n)$$

$$TQ_4 = (TQ_0 - tTQ_0) + tTQ_1 \quad (3o)$$

$$DF_4 = (DF_0 - tDF_0) + tDF_1 \quad (3p)$$

In equations (3i)–(3p): SR, SG, and SB represent specular components for red, green and blue at $V_4$; TS, TT, TR and TQ represent texture mapping components at $V_4$; and, DF represents a downstream fog value for $V_4$.

The simultaneous computation of the sixteen equations 3a–3p requires sixteen programmed arithmetic mechanisms. Just as before, we'd like the four cases to be handled without the need for multiple sets of the sixteen programmed arithmetic mechanisms. Accordingly, the sixteen programmed arithmetic mechanisms that evaluate Eq's (3a–3p) also incorporate an address translator whose inputs include the type and subtype. The general nature of the interchange is the same as that for Eq. (2); specifically, it needs to be able to replace (subscript) 1's with (subscript) 3's.

Now, before moving on to a discussion of the hardware, there are a few inconvenient special cases that need to be discussed. Equations (1) and (2) are evaluated prior to the perspective divide (where the W's are put to final use and "gotten rid of"), which in turn is performed after clipping. That, and the presence of the W's in these equations, means that the hardware has to recognize these exceptional cases and make special provisions for them. The first special case concerns division by zero in Eq. (1). This could happen either because one or more of the three factors in the denominator are zero (the three factors are the two W's and the difference). If this happens there is no finite value for the $X_{LIMIT}$ or $Y_{LIMIT}$ being sought. In such a case t is set to a value of zero.

Even if a division by zero is not detected, the result of the calculation is nevertheless checked to ensure that the clip plane location really does lie on $S_{01}$ for a Type A bow-tie or on $S_{03}$ for a Type B bow-tie. These checks are advisable, since finite precision arithmetic can do funny things when maximal and minimal values are encountered. If it should turn out that the location of the clipping plane is beyond either endpoint, then the closest endpoint is taken as the result, instead.

A similar set of concerns about dividing by zero arise for Eq. (2). Ideally, t ought to have a value that lies within the range $0 \leq t \leq 1$. The division to find t is allowed to begin; it will take some modest number of clock cycles to complete. During the interim a separate mechanism determines if a division by zero is being attempted. If so, the ongoing division is aborted and t is forced to have a value of zero. And even if there is not divide by zero, the $0 \leq t \leq 1$ relationship is checked after the divide is complete. If t is negative that negative value is replaced by a value of zero, and if t is greater than one that too-large of a value is replaced by a value of one. This has the effect of setting the point of intersection $V_4$ at one or the other of the ends of the edge ($S_{01}$ or $S_{03}$)

Refer now to FIG. 7, wherein is depicted a simplified block diagram 9 of a hardware arrangement that may be used to remove bow-tie quadrilaterals from the objects processed by a graphics subsystem. A transform mechanism 11 operates on the coordinates of primitive objects to adjust them from one environment to another. A bow-tie quadrilateral 10 (shown for convenience as a geometric figure, rather than as a list of coordinates) is depicted as the next primitive to be processed. The transformed coordinates from the transform mechanism 11 are coupled to a trivial accept/reject mechanism 12 whose task it is to determine (in a known way by examination of the clip codes associated with the primitive at hand) whether or not that primitive needs to be non-trivially clipped. See Foley and Van Dam for a discussion of clip codes. The primitives are next operated upon by a classifier 13, whose input is coupled to the output of the trivial accept/reject mechanism 12. The classifier 13 examines the list of vertices for a primitive and determines if it is a triangle, quadrilateral, etc. It attaches an indication of what it found to that list. Next in the sequence is an optional illumination mechanism 14 that supplements the coordinates of the vertices with data derived from light sources. The output of the illumination mechanism 14 is coupled to a bow-tie eliminator 15.

The bow-tie eliminator 15 determines if a primitive classified by the classifier 13 as a quadrilateral is a self-intersecting quadrilateral (bow-tie). It if is, it turns it into two triangles. In the process of doing this it saves hardware by using the clipper 16 to assist in computing the bow-tie's vertex of self intersection, $V_4$. This will shortly be described in greater detail below.

To continue with FIG. 7, the primitives are next passed to the clipper 16, where those that need clipping receive it. The clipped primitives are then coupled to a rasterizer 17. This mechanism decomposes the primitives into triangles and then supplies from the vertices complete pixel by pixel descriptions of the resulting triangles. The resulting complete pixel level description is then stored in a frame buffer 18 from whence a corresponding image is drawn upon a CRT 19.

In an actual implementation all of the six elements 11–16 are located on one single integrated circuit. And rather than being six totally independent and autonomous mechanisms, they share the various resources on the chip, including, but not limited to, arithmetic units, registers, and controlling state machines. Because of these shared resources and their programmatically controlled use, the actual hardware block diagrams for those six elements are similar to one another, are rather huge, and do not particularly reveal their ultimate purpose. Instead of attempting to describe all that in gruesome detail, we shall for now simply note that it is a large collection of shared resources, all interconnected by suitable busses, and instead discuss in connection with FIG. 8 a process diagram, or flow diagram, that describe the bow-tie related actions produced by the controlling state machines in the integrated circuit. After that it will be feasible to take a more detailed look at just the bow-tie eliminator 15 in isolation.

Refer now to FIG. 8, which is a flow diagram 20 of processes within the bow-tie eliminator 15 of FIG. 7 and carried out by the controlling state machines in the integrated circuit (not itself shown). Steps 21 and 22 determine the Type, which is recorded for future use is steps 23 and 24. If the quadrilateral is neither Type A nor Type B, then step 25 represents the non-bow-tie case where the quadrilateral at hand need not be further treated by the bow-tie eliminator 15.

Steps 26 and 27 determine the Subtype, which is then subsequently recorded by steps 28–31 for future use. Step 32 represents the application of Eq. (1) to find the clipping plane that contains $V_4$. Recall that the application of Eq. (1) is adapted to the four possible combinations of Type and Subtype by the address translation table.

The next step 33 is to invoke either steps 34–36 in the event the Type is A, or steps 37–39 if it is B. For those respective Types these steps clip the appropriate edge of the bow-tie against the clipping plane and compute the complete collection of coordinates for V4, followed by a decomposition of the bow-tie into constituent non-overlapping triangles, each containing two adjacent vertices not found in the other triangle and each also containing V4 as a common vertex. With that, the bow-tie eliminator 15 has completed its operation upon the bow-tie at hand.

Refer now to FIG. 9, which is a more detailed, yet still simplified, expansion of the block diagram of FIG. 7, with special emphasis on those portions of that block diagram that are for the bow-tie eliminator 15 and clipper 16. As shown in FIG. 9, a dispatcher state machine 40 is responsive to a START signal 41 by starting and stopping in an appropriate sequence various other state machines that perform particular functions or operations upon quadrilaterals. These other state machines include (and the figure does not show, nor do we mention, all such state machines) a transform state machine 43, an illumination state machine 44, and (the one of greatest interest here), a bow-tie eliminator & clipper state machine 45. When all this lot has done what it is supposed to do on a quadrilateral, the dispatcher state machine 40 issues a DONE signal 42.

To continue at this same level of abstraction, a bus 46 (which is actually a rather substantial collection of busses and control lines) conveys instructions, data and status information among the aforementioned state machines 43, 44 and 45, as well as to and amongst other resources. These additional resources include RAM 47, a register file 48 and an ALU 49. RAM 47 is, in a preferred embodiment, a genuine 320 by 32-bit addressable random access memory architecture. It is in this memory that lists of vertices and their associated coordinates are stored as appropriate data structures. The register file 48 is a collection of sixty-four by 32-bit addressable registers. Reads and writes for these registers occur using any of six ports. (Think: six separate but otherwise identical busses, each including their associated read and write control lines.) This arrangement supports simultaneous reading and writing to pluralities of registers. These registers are used primarily in conjunction with the ALU 49 and other arithmetic resources to perform computations. For example, the transform state machine 43 and the clipper state machine (p/o 45) each need substantial arithmetic services. Register file 48 and ALU 49 provide them.

It will be noted that in this figure the state machines for the bow-tie eliminator and for the clipper are shown as combined into one block 45. This is in contrast with a convenient simplification in FIG. 7, where they are shown as separate (but capable of cooperation). At this point in the disclosure the reader will appreciate why we now shown them as combined. First, there are in this particular preferred embodiment no arithmetic resources owned exclusively by the clipper: the clipper uses the same ALU 49 as everybody else. So, when we say that the bow-tie eliminator uses the clipper to accomplish some of its task, we might mean that the bow-tie eliminator is a copy cat that mimics some of the activities of the (completely separate) clipper, and thus that in some sense parts of a clipper mechanism actually (physically) exist twice (once for the "real clipper" and a duplicate for the bow-tie stuff). That would work, but that is not what we mean, as to do it that way would be inefficient and wasteful, however fast it might run. Instead, the present preferred embodiment merges the otherwise separate state machines for the bow-tie elimination function and the clipping function. That has the advantage that the result is single threaded, so that one function never gets clobbered by the other, and also the not insignificant advantage of requiring only the minimum amount of hardware (the chip is already huge).

FIG. 9 also contains a simplified expansion of what is in the box 45 labelled bow-tie eliminator & clipper state machines. The expansion includes a control state machine 53 that keeps track of whether a bow-tie related process or a clipper related process is being done. A math state machine 50 oversees a repertoire of arithmetic services, many of which might be needed for both the bow-tie process and the clipping process. State machines 50 and 53 can interact via communication over bus 46.

As shown in this part of the figure, state machines 50 and 53 also are coupled to an address translator 51. What is coupled are register addresses destined for use with operations on register file 48. In particular, they are the register addresses that would appear if Type A and Subtype x were the only combination that ever occurred. The address translator 51 also receives the Type and Subtype for an evil bow-tie that needs to be decomposed into two triangles. What the address translator 51 does is trade Ax register addresses for those corresponding to the other cases, during those respective times when those different cases exist. The nature of that trading was previously explained in connection with Eq's (1–3). The address translator 51 could be implemented as a RAM-based look-up table, but in a preferred embodiment is made from a gate array, as that is significantly faster.

Refer now to FIG. 10, which is a detailed flow chart depicting the behavior the state machine 53 of FIG. 9. FIG. 10 illustrates how the operations of controlling clipping and controlling bow-tie elimination have been merged into a combined mechanism, such that the clipping hardware serves both the functions of a clipper and those of bow-tie elimination. This flow diagram was the source used to obtain actual bits defining state machine 53, with the use of a hardware description language such as Verilog or VHDL. The numbers in circles are not patent document reference characters, but are the names of the different states of the resulting state machine. FIG. 11 is an expansion of states 5–24 ("Do Single Clip Plane"). The notation used in these flow charts borrows freely from the C programming language.

I claim:

1. A method of decomposing self-intersecting quadrilaterals in a computer graphics system into triangles, the method comprising the steps of:

assigning a type to a self-intersecting quadrilateral whose sides are denoted in terms of ordered vertices, the type assigned being indicative of how the self-intersection occurs in relation to the ordinal values of the vertices;

assigning to the self-intersecting quadrilateral a subtype indicating within which of the X and Y axes the self-intersecting quadrilateral has the greater extent;

if the greater extent is in X then determining a YZ work plane containing the vertex of self-intersection;

if the greater extent is in Y then determining an XZ work plane containing the vertex of self-intersection;

using the clipper to determine the vertex of self-intersection by intersecting one of the self-intersecting sides with the work plane; and dividing the self-intersecting quadrilaterals into two triangles, each triangle containing two adjacent vertices not found in the other triangle and each also containing the vertex of self-intersection as a common vertex.

2. A method as in claim 1 further comprising the step of storing vertex information in addressable registers and the step of accessing the content of the addressable registers, wherein commands for such storing and accessing originate as though there were by a single combination of type and subtype, and are modified by an address translation that is a function of type and subtype.

* * * * *